United States Patent [19]

Gergen et al.

[11] Patent Number: 4,839,437

[45] Date of Patent: Jun. 13, 1989

[54] BLENDS OF POLYKETONE POLYMER WITH AN AT LEAST PARTIALLY CRYSTALLINE POLYAMIDE POLYMER

[75] Inventors: William P. Gergen, Houston, Tex.; Robert G. Lutz, Santa Rosa, Calif.

[73] Assignee: Shell Oil Company, Houston, Tex.

[21] Appl. No.: 187,790

[22] Filed: Apr. 29, 1988

[51] Int. Cl.$^4$ .............................................. C08L 23/08
[52] U.S. Cl. .................... 525/426; 525/211; 525/285
[58] Field of Search ................ 525/426, 285, 211

[56] References Cited

U.S. PATENT DOCUMENTS

| | | | |
|---|---|---|---|
| 2,071,250 | 2/1937 | Carothers | 260/106 |
| 2,071,251 | 2/1937 | Carothers | 18/54 |
| 2,130,523 | 9/1938 | Carothers | 260/121 |
| 2,130,948 | 9/1938 | Carothers | 18/54 |
| 2,241,322 | 5/1941 | Hanford | 260/2 |
| 2,312,966 | 3/1943 | Hanford | 260/78 |
| 2,495,286 | 6/1949 | Brubaker | 260/63 |
| 2,512,606 | 6/1950 | Bolton et al. | 260/78 |
| 3,393,210 | 7/1968 | Speck | 260/371 |
| 3,554,944 | 1/1971 | Helm | 260/18 |
| 3,694,412 | 9/1972 | Nozaki | 260/63 |
| 4,320,213 | 3/1982 | Woodbrey et al. | 525/179 |
| 4,338,227 | 7/1982 | Ballard | 525/211 |
| 4,459,394 | 7/1984 | Coffey et al. | 526/90 |
| 4,461,885 | 7/1984 | Wu et al. | 528/310 |
| 4,565,849 | 1/1986 | Horikawa et al. | 525/240 |
| 4,613,533 | 9/1986 | Loomis et al. | 525/211 |
| 4,628,077 | 12/1986 | Desmond et al. | 526/90 |

FOREIGN PATENT DOCUMENTS

| | | |
|---|---|---|
| 121965 | 10/1984 | European Pat. Off. |
| 181014 | 5/1986 | European Pat. Off. |
| 1081304 | 8/1967 | United Kingdom |

Primary Examiner—John Kight
Assistant Examiner—T. Mason
Attorney, Agent, or Firm—Wendy K. B. Buskop

[57] ABSTRACT

A composition comprising a blend of a linear alternating polymer of carbon monoxide and at least one ethylenically unsaturated hydrocarbon and an at least partially crystalline polyamide polymer having a number average molecular weight of at least 5,000, a process for making the blend, and articles prepared thereof.

29 Claims, No Drawings

BLENDS OF POLYKETONE POLYMER WITH AN AT LEAST PARTIALLY CRYSTALLINE POLYAMIDE POLYMER

BACKGROUND OF THE INVENTION

This invention is concerned with blends of polyketone polymers and crystalline or semicrystalline polyamide polymers.

Crystalline or semicrystalline polyamides, such as nylon 6,6, are a class of materials which possess a good balance of properties comprising strength and stiffness which make them useful as structural materials can be added to a polyketone polymer to result in a blend with good impact strength, capable of deep drawing and solid phase forming.

By physically blending polymers of polyketone with crystalline or semicrystalline polyamides the result is a toughened polyketone, having good structural strength, as well as ductileness.

It is well known to those skilled in the art that polyamides possess many of the properties which advantageously result in impact modified plastics. The addition of polyamides to polyketone polymers has been found to yield a blend which additionally has improved "paintability" and improved ability to accept basic dyes. The novel blend has a viscosity which is easy to mold and capable of providing a quick release from the mold.

The general class of polyketone polymers of carbon monoxide and one or more ethylenically unsaturated hydrocarbons has been known for some years. Brubaker, U.S. Pat. No. 2,495,286, produced such polymers of relatively low carbon monoxide content in the presence of free radical initiators such as benzoyl peroxide. British Pat. No. 1,081,304 produced such polymers of higher carbon monoxide content in the presence of alkylphosphine complexes of palladium as catalyst. Nozaki extended the process to produce linear alternating polymers in the presence of arylphosphine complexes of palladium. See, for example, U.S. Pat. No. 3,694,412.

More recently, the class of linear alternating polymers of carbon monoxide and unsaturated hydrocarbons, now known as polyketones, has become of greater interest, in part because of improved methods of production.

These polymers, often referred to as polyketone or polyketone polymers have been shown to be of the repeating formula —CO—(A)— where A is the moiety of an ethylenically unsaturated hydrocarbon polymerized through the ethylenic unsaturation. For example, when the ethylenically unsaturated hydrocarbon is ethylene, the polymer will be represented by the repeating formula —CO—(CH$_2$CH$_2$)—.

The general process for preparing polyketones, is illustrated by a number of European Patent Applications including European Patent Application No. 0121965 directed towards a preparation of polyketones to obtain a high yield, wherein a mixture of carbon monoxide and alkenically unsaturated hydrocarbon is polymerized in the presence of a Group VIII metal catalyst (such as palladium, cobalt or nickel) the anion of a strong non-hydrohalogenic acid having a pKa below 2, and a bidentate ligand of phosphorous, arsenic or antimony.

Polyketones prepared with the novel catalyst, result in a novel, linear alternating polyketone polymer which has not been blended with crystalline or semicrystalline polyamides to form novel and useful blends having good solvent resistance, impact strength and high melting points.

As a result, the present invention is directed towards blends of polyketones with crystalline or semicrystalline polyamides, such as crystalline nylon.

SUMMARY OF THE INVENTION

The present invention is a blend of:

(a) a linear alternating polymer of carbon monoxide and at least one ethylenically unsaturated hydrocarbon; and (b) a crystalline or semicrystalline polyamide having a number average molecular weight of at least 5000.

The invention also relates to compositions wherein the ratio of the components designated as (a) and (b) are in ratios between 99:1 and 1:99; 5:95; and 95:5; 10:90 and 90:10; 20:80 and 80:20.

More specifically the invention relates to a blend wherein the linear alternating polymer is of the formula

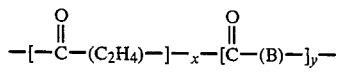

wherein B is the moiety of an ethylenically unsaturated α-olefin of at least 3 carbon atoms polymerized through the ethylenic unsaturation, the ratio of y:x is no more than about 0.5.

In a preferred embodiment, the linear alternating polymer is of the formula

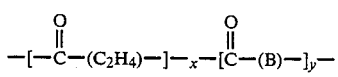

wherein B is the moiety of an ethylenically unsaturated α-olefin of at least 3 carbon atoms polymerized through the ethylenic unsaturation, and wherein group B of said linear alternating polymer is propylene and the ratio of y:x is from about 0.01 to about 0.2.

The linear alternating polymer can, in some embodiments, comprise a second ethylenically unsaturated hydrocarbons. The crystalline or semicrystalline polyamide can be nylon 6, nylon 6,6, nylon 6,10, nylon 11, nylon 12, nylon 6,12 and mixtures thereof.

Further, the present invention relates to a process for preparing a blend of a linear alternating polymer of carbon monoxide and at least one ethylenically unsaturated hydrocarbon and a crystalline or semicrystalline polyamide, wherein the process comprises the steps of:

(i) adding a linear alternating polymer of carbon monoxide and at least one ethylenically hydrocarbon to a crystalline or semicrystalline polyamide forming a mixture; and (ii) blending the mixture at temperatures between about 175° C. and about 300° C. therein forming a polymer blend.

The present invention also relates to a process for preparing a blend of linear alternating polymers of carbon monoxide and at least one ethylenically unsaturated hydrocarbon by a masterbatch process.

The present invention also relates to articles prepared from a polymeric composition comprising:

(a) a linear alternating polymer of carbon monoxide and at least one ethylenically unsaturated hydrocarbon; and (b) a crystalline or semicrystalline polyamide having a number average molecular weight of at least 5000.

DETAILED DESCRIPTION OF THE INVENTION

The polyketone polymers which are employed as a component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, butylene, isobutylene, 1-octene, and 1-dodecene, or are arylaliphatic containing an aryl substituent on an otherwise aliphatic moiety, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketones are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polyketone polymer is that of a linear alternating polymer of carbon monoxide and at least one ethylenically unsaturated hydrocarbon and the polymer will contain substantially one moiety of carbon monoxide for each moiety of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a moiety of the second hydrocarbon, preferably from about 10 units to about 100 units incorporating a moiety of ethylene for each unit incorporating a moiety of the second hydrocarbon. The polymer chain is therefore represented by the formula

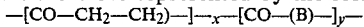
—[CO—CH$_2$—CH$_2$)—]—$_x$—[CO—(B)—]$_y$— where B is the moiety obtained by polymerization of the second hydrocarbon through the ethylenic unsaturation. The —[—CO—(CH$_2$—CH$_2$—)—units and the —CO—(B)—units are found randomly throughout the polymer chain and the ratio of y:x is no more than about 0.5. In the modification of the invention where copolymers of carbon monoxide and ethylene are employed as a blend component and there is no second hydrocarbon in the polymer chain, the polymer is represented by the above formula wherein y = 0. If y is other than 0, i.e., terpolymers are employed, ratios of y:x should be no more than 0.5 and preferably from about 0.01 to about 0.2. The end groups or "caps" of the polymer chain will depend on what materials were present during the preparation of the polyketone polymer and whether and how the polymer was purified. The precise properties of the polymer will not depend to any considerable extent upon the particular end groups so that the polymer is fairly represented by the above formula for the polymer chain.

Of particular interest are those polyketones of high molecular weight from about 1,000 to about 500,000, especially those of molecular weight over 10,000. The physical properties of the polyketone polymers will depend in part on the molecular weight of the polymer, whether the polymer is a copolymer or a terpolymer and the proportion of the second hydrocarbon present in the case of a terpolymer.

Typical melting points are from about 175° C. to about 300° C., more typically from about 180° C. to about 285° C. Polyketone polymers usable herein may have melting points of between about 190°–230° C. and polymers with melting points ranging from about 230° C. to about 270° C. may be usable herein.

Useful polyketones for the novel blends have limiting viscosity numbers (LVN) as measured by the method wherein the polymer is dissolved in metacresol at 60° C.; using a standard capillary viscosity measuring device, such as a Cannon-Ubbelohde viscometer in the range of 0.5 to 10 LVN and more preferably 0.8 to 4 LVN and most preferably 0.8 to 2.5 LVN.

A method of producing the polyketone polymers which is now becoming conventional is to contact the carbon monoxide and ethylenically unsaturated hydrocarbon(s) in the presence of a palladium compound, the anion of a non-hydrohalogenic acid having a pKa below about 6 and a bidentate phosphorus ligand. The scope of the process of polyketone production is extensive but, without wishing to be limited, a preferred palladium compound is a palladium carboxylate, particularly palladium acetate, the preferred anion is the anion of trifluoroacetic acid or p-toluenesulfonic acid, and the preferred bidentate ligand is 1,3-bis(diphenylphosphino)propane or 1,3-bis[di(2-methoxyphenyl)-phosphino]propane. Such a process for polyketone production is illustrated by copending U.S. application Ser. No. 930,468, filed Nov. 14, 1986.

Polymerization is conducted in a gas phase in either the absence of diluent or the substantial absence of diluent or in a liquid phase in the presence of an inert diluent such as an alkanol, e.g., methanol or ethanol. The reactants are contacted under polymerization conditions in the presence of the catalyst composition by conventional methods such as shaking or stirring. Suitable reaction temperatures are from about 20° C. to about 150° C., preferably from about 50° C. to about 135° C. Typical reaction pressures are from about 1 bar to about 200 bar, more typically from about 10 bar to about 100 bar. Subsequent to reaction the polymer product is recovered as by decantation or filtration. The polymer product may contain residues of the catalyst which are removed, if desired, by treatment with a solvent or a complexing agent which is selective for the residues.

The polyketone blends herein are limited to "crystalline" or "semicrystalline" polyketone blending wherein some crystallinity occurs in one or more components of the polyketone blend while maintaining a blend of the amorphous phases of the components.

It has been discovered that when a mixture of (a) a major amount of a polyketone copolymer or terpolymer such as one of the types described above, with (b) a minor amount of a crystalline or semicrystalline polyamide, are blended in relative proportions by weight based on the total weight of the composition, a novel and useful blend is produced. It is, however, contemplated that a suitable polyketone/polyamide blend can be prepared from about 1:99 weight percent polyketone and about 1:99 weight percent crystalline or semicrystalline polyamide polymer. Blends of components (a) and (b) may also be blended in relative proportions of about 80:20 weight percent polyketone with 20:80 weight percent polyamide, or ratios of 70:30 to 30:70, or 60:40 to 40:60, or may be, in approximately equal proportions by weight, i.e. (a):(b) =50:50.

The compositions of the invention may be modified by one or more conventional additives such as stabilizers and inhibitors of oxidative, thermal, and ultraviolet light degradation; lubricants and mold release agents, fire resistant materials, colorants including dyes and pigments, and other substances to modify the polymer. The additives can be incorporated into the composition at any stage in the preparation of the thermoplastic composition. Preferably the stabilizers are included early to preclude the initiation of degradation before the composition can be protected.

The polyamide usable herein is well known in the art and embraces those crystalline or semicrystalline compositions having a molecular weight of at least 5000 and which are commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210. The polyamide usable herein can be produced by condensation of equimolar amounts of a saturated dicarboxylic acid containing from 4 to 14 carbon atoms. Excess diamine can be employed to provide an excess of amine end groups over carboxyl end groups in the polyamide. Examples of preferred polyamides usable herein include nylon 6, polyhexamethylene adipamide (nylon 6,6) polyhexamethylene sebacamide (nylon 6,10), nylon 11, nylon 12, and polyhexamethylene dodecanoamide (nylon 6,12). The polyamides produced by ring opening of lactams, i.e., polycaprolactam, polylauric lactam, poly-11-aminoundecanoic acid, bis(paraaminocyclohexyl) methane dodecanoamide, are contemplated as usable herein. It is possible, to use in this invention, polyamides prepared by the copolymerization of two of the above polymers or terpolymerization of the above polymers or their components, e.g., an adipic isophthalic acid hexamethylene diamine copolymer. Polyamides usable herein include one which are linear with a melting point in excess of 200° C.

It is to be understood that in the specification and claims herein, unless otherwise indicated, the amount of the polyamide or polyketone is expressed in terms of percent by weight, it is meant percent by weight on the total amount of the blend.

EXAMPLES

To assist those skilled in the art in the practice of this invention, the following Examples are set forth as illustrations, part and percentages being by weight unless otherwise specifically noted.

The method of producing the blend of the polyketone polymer with the crystalline or semicrystalline polyamide is not material as long as a relatively uniform distribution of the polyamide through the polyketone is obtained. It is preferred for the blend to have intimate mixing of the polymers, i.e. microscopic distribution of polyamide through the polyketone, having the size of the dispersed phase to be no more than about 10 microns, preferably about 1 micron. In one modification, the blend components are extruded and the blend is obtained as an extrudate. In an alternative modification, the component are blended in other mixing devices, such as high shear mixing devices or low shear mixing devices.

Illustrative Blend Formulations

Composition 1: (Control)

100% by weight polyketone, 056/002 (available from Shell Chemical Co. of Houston, Texas) is a linear alternating terpolymer of carbon monoxide, ethylene and propylene were produced in the presence of a catalyst composition formed from palladium acetate, the anion of trifluoroacetic acid and 1,3-bis[diphenyl phosphino)-propane. The melting point of the terpolymer was 221° C. and the polymer had a limiting viscosity number (LVN) of 1.48 (measured at 60° C. in m-cresol). The polyketone was cyroground under nitrogen using a 60-70 mesh screen, dried overnight at 50° C. then molded into small plates, cut into strips, and aged in an oven for a period of days. The specimens were tested for breakage by finger bending the strips. The test results appear in Table I, below.

Composition 2:

The polyketone material of Composition 1 was cryoground using a 60 or 70 mesh screen and dry tumbled with cryoground nylon 6,6 (here as Zytel 101, a molding grade available from DuPont) in amounts of 90% by weight polyketone and 10% by weight polyamide nylon 6,6. The dry tumbled 90/10 blend was charged to one stage of a twin screw co-rotating extruder, a 30 mm Baker-Perkins extruder. The extruder melt temperature profile varied from 220° C. in the feed zone to 285° C. at the die. A screw speed of 50% torque maximum at about 300 rpm was used. The blends were starve-fed into the extruder. The extruder strand was quenched in water at room temperature then chopped and pelletized. Pellets were molded into small plates, cut into strips and aged in an oven for a period of days. The specimens were tested for breakage by finger bending the strips.

Compositions 3:

The polyketone material of Composition 1 were cryoground using a 60 or 70 mesh screen dry tumbled with cryoground nylon 6 (here, Capron 8207, available from Allied Chemical, now known as Allied Signal) in amounts of 90% wt polyketone and 10% wt nylon 6. The dry tumbled 90-10 blend was charged to one stage of a twin screw, co-rotating extruder, a 30 mm Baker Perkins extruder. The extruder melt temperature profile varied from 220° C. in the feed zone to 285° C. at the die. The screw speed for 50% torque maximum at about 300 rpm was used. The blends were starve fed into the extruder. The extruded strand was quenched in water at room temperature then chopped and pelletized. Pellets were molded into small plates. Strips were cut from the plates and aged in an oven for a period of days. The samples were tested for breakage by finger bending the samples.

The physical properties of this composition are presented in Table I.

TABLE I

|  | Compositions | | |
| --- | --- | --- | --- |
|  | 1 | 2 | 3 |
| Nylon 6 (parts by weight) | — | — | 10 |
| Nylon 6,6 (parts by weight) | — | 10 | — |
| Polyketone 056/002 (parts by weight) | 100 | 90 | 90 |
| Oven Aging at 100° C. (mean time to failure - days) | 4 | 8 | 2 |
| Oven Aging at 120° C. | — | 2 | 0.2 |

TABLE I-continued

| | Compositions | | |
|---|---|---|---|
| | 1 | 2 | 3 |
| (mean time to failure - days) Yellowness Index as determined by ASTM D-1925 after 100° C. aging | 59 | 108 | 48 |
| Cell size determined by visual inspection of a scanning transmission micrograph | — | 0.2 | 0.8 |

Within the scope of the invention, it is contemplated that 15 mm twin screw extruders may also be used to prepared the novel blends. Even larger equipment is contemplated as useful herein. The rpm speed and melt temperatures of the extruder can be varied and still produce blends within the scope of the invention. For example, extruder temperatures ranging from 175° C. to 300° C. can be used with 190° C. to 280° C. being a preferred range. Polymer can be starve-fed into the extruder or flood-fed, or fed in a range between the extremes and produce blends which remain within the scope of the invention. The processing conditions for the blends will have to be regulated such as by limiting residence time of the contents of the mixing device in order to limit possible polymer degradation and achieve desired intimate mixing of the polymers.

Alternative methods for preparing a blend can be used within the scope of this invention. For example, a masterbatch method can be used to form the unique blend. In a masterbatch process, a first polyketone can be blended, (such as by tumbling) with a polyamide. This first blend can be blended in the extruder at temperatures of 170° C. to 300° C., extruded and quenched as described above. The resulting strand can be chopped into blend pellets. These blended pellets can then be optionally dried then, mixed with a second polyketone polymer or alternatively, added to additional first polyketone polymer in pellet form. These mixed blend pellets and polyketone polymers can be blended at temperatures that range from 170° C. to 300° C., extruded and quenched as described above.

The foregoing embodiments are intended to illustrate but not to limit the invention. Various modifications can be made in the invention without departing from the spirit and scope.

What is claimed:

1. A composition comprising a blend of a linear alternating polymer of carbon monoxide and at least one ethylenically unsaturated hydrocarbon and an at least partially crystalline nylon polyamide polymer having a number average molecular weight of at least 5,000.

2. The composition of claim 1, wherein said linear alternating polymer is of the formula

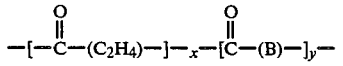

wherein B is the moiety of an ethylenically unsaturated α-olefin of at least 3 carbon atoms polymerized through the ethylenic unsaturation, the ratio of y:x is no more than about 0.5.

3. The composition of claim 1, wherein said linear alternating polymer is of the formula

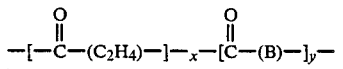

wherein B is the moiety of an at least one ethylenically unsaturated α-olefin of at least 3 carbon atoms polymerized through the ethylenic unsaturation, and wherein group B of said linear alternating polymer is propylene, and the ratio of y:x is from about 0.01 to about 0.2.

4. The composition of claim 2, wherein said linear alternating polymer comprises a second ethylenically unsaturated hydrocarbon.

5. The composition of claim 2 wherein y is zero.

6. The composition of claim 1, wherein the at least partially crystalline polyamide polymer is a member of the group nylon 6, nylon 6,6, nylon 6,10 nylon 11, nylon 12, nylon 6,12, or mixtures thereof.

7. The blend of claim 2, wherein the at least partially crystalline polyamide is a member of the group nylon 6, nylon 6,6, nylon 6,10, nylon 11, nylon 12, nylon 6,12, or mixtures thereof.

8. The composition of claim 1, wherein the ratio of linear alternating polymer of carbon monoxide and at least one ethylenically unsaturated hydrocarbon to the at least partially crystalline polyamide polymer is between about 1:99 and about 99:1, respectively.

9. The composition of claim 8, wherein the ratio is between about 5:95 and about 95:5.

10. The composition of claim 1, wherein the at least partially crystalline polyamide polymer is selected from the group consisting of polyhexamethylene adipamide, polyhexamethylene sebacamide, polycaprolactam, or mixtures thereof.

11. The composition of claim 2, wherein the at least partially crystalline polyamide polymer is selected from the group consisting of polyhexamethylene adipamide, polyhexamethylene sebacamide, polycaprolactam, or mixtures thereof.

12. A process for preparing a blend of a linear alternating polymer of carbon monoxide and at least one ethylenically unsaturated hydrocarbon and an at least partially crystalline polyamide polymer wherein said process comprises the following steps:
 (i) adding a linear alternating polymer and at least one ethylenically unsaturated hydrocarbon to an at least partially crystalline polyamide polymer forming a mixture; and
 (ii) blending the mixture at temperatures between about 175° C. and about 300° C. herein forming a polymer blend.

13. The process of claim 12, wherein said linear alternating polymer is of the formula

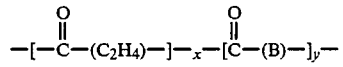

wherein B is the moiety of an ethylenically unsaturated α-olefin of at least 3 carbon atoms polymerized through the ethylenic unsaturation, the ratio of y:x is no more than about 0.5.

14. The process of claim 12, wherein said linear alternating polymer is of the formula

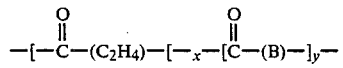

wherein B is the moiety of at least one ethylenically unsaturated α-olefin of at least 3 carbon atoms polymerized through an ethylenic unsaturation, and wherein group B of said linear alternating polymer is propylene and the ratio of y:x is from about 0.01 to about 0.2.

15. The process of claim 12, wherein said linear alternating polymer comprises a second ethylenically unsaturated hydrocarbon.

16. The process of claim 13, wherein y is zero.

17. The process of claim 12, wherein the at least partially crystalline polyamide polymer is a member of the group nylon 6, nylon 6,6, nylon 6,10, nylon 11, nylon 12, nylon 6,12, on mixtures thereof.

18. The process of claim 12, wherein the blending is performed at temperatures between about 190° C. and about 285° C.

19. The process of claim 12, wherein the ratio of linear alternating polymer of carbon monoxide and at least one ethylenically unsaturated hydrocarbon to at least partially crystalline polyamide polymer is between about 1:99 and about 99:1.

20. An article prepared from a polymeric composition comprising:
(a) a linear alternating polymer of carbon monoxide and at least one ethylenically unsaturated hydrocarbon; and
(b) an at least partially crystalline polyamide polymer having a number average molecular weight of at least 5000.

21. The article of claim 20, wherein said linear alternating polymer is of the formula

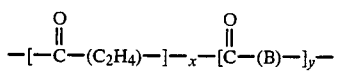

wherein B is the moiety of an ethylenically unsaturated 60-olefin of at least 3 carbon atoms polymerized through the ethylenic unsaturation, the ratio of y:x is no more than about 0.5.

22. The article of claim 20, wherein said linear alternating polymer is of the formula

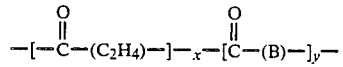

wherein B is the moiety of at least one ethylenically unsaturated α-olefin of at least 3 carbon atoms polymerized through the ethylenic unsaturation, and wherein group B of said linear alternating polymer is propylene and the ratio of y:x is from about 0.01 to about 0.2.

23. The article of claim 20, wherein said linear alternating polymer further comprises a second ethylenically unsaturated hydrocarbon.

24. The article of claim 21, wherein y is zero.

25. The article of claim 20, wherein the at least partially crystalline polyamide polymer is a member of the group nylon 6, nylon 6,6, nylon 6,10, nylon 11, nylon 12, nylon 6,12, or mixtures thereof.

26. The article of claim 20, wherein the at least partially crystalline polyamide polymer is selected from the group consisting of polyhexamethylene adipamide, polyhexamethylene sebacamide, polycaprolactam, or mixtures thereof.

27. The article of claim 21, wherein the at least partially crystalline polyamide polymer is a member of the group nylon 6, nylon 6,6 nylon 6,10, nylon 11, nylon 12, nylon 6,12, and mixtures thereof.

28. The article of claim 21, wherein the at least partially crystalline polyamide polymer is selected from the group consisting of polyhexamethylene adipamide, polyhexamethylene sebacamide, polycaprolactam, or mixtures thereof.

29. The article of claim 20, comprising:
(a) from 1 to 99 percent by weight of a linear alternating polymer of carbon monoxide and at least one ethylenically unsaturated hydrocarbon; and
(b) from 99 to 1 percent by weight of an at least partially crystalline polyamide polymer having a number average molecular weight of at least 5000.

* * * * *